United States Patent [19]
Kim

[11] Patent Number: 5,675,457
[45] Date of Patent: Oct. 7, 1997

[54] HEAD DRUM ASSEMBLY FOR USE IN A VIDEO CASSETTE RECORDER

[75] Inventor: Keum-Mo Kim, Seoul, Rep. of Korea

[73] Assignee: Video Research Center, Daewoo Electronics, Seoul, Rep. of Korea

[21] Appl. No.: 573,810

[22] Filed: Dec. 18, 1995

[30] Foreign Application Priority Data

Mar. 29, 1995 [KR] Rep. of Korea ............... 95-6844

[51] Int. Cl.$^6$ .................. G11B 5/52; G11B 15/61
[52] U.S. Cl. .................................. 360/107; 360/84
[58] Field of Search ................. 360/107, 84–85, 360/95, 104–106, 130.24

[56] References Cited

U.S. PATENT DOCUMENTS

| | | | |
|---|---|---|---|
| 4,301,487 | 11/1981 | Marujama | 360/107 |
| 4,316,225 | 2/1982 | Marujama et al. | 360/107 |
| 4,363,047 | 12/1982 | Maruyama et al. | 360/107 |
| 4,706,143 | 11/1987 | Asada et al. | 360/107 |
| 4,972,283 | 11/1990 | Kim | 360/107 |
| 5,019,926 | 5/1991 | Van Thuijl et al. | 360/107 X |
| 5,442,506 | 8/1995 | Kang | 360/84 X |
| 5,453,892 | 9/1995 | Hasegawa et al. | 360/107 |

*Primary Examiner*—John H. Wolff
*Attorney, Agent, or Firm*—Anderson Kill & Olick P.C.

[57] ABSTRACT

A head drum assembly for use in a video cassette recorder includes a rotating shaft, a rotary drum coupled with the rotating shaft, a stationary drum attached to the rotating shaft under the rotary drum, a rolling bearing disposed between the rotating shaft and the upper part of the stationary drum, and a sliding bearing disposed between the rotating shaft and the lower part of the stationary drum.

6 Claims, 9 Drawing Sheets

HEAD DRUM ASSEMBLY FOR USE IN A VIDEO CASSETTE RECORDER

FIELD OF THE INVENTION

The present invention relates to a head drum assembly for use in a video cassette recorder ("VCR"); and, more particularly, to a head drum assembly having a simple structure and the capability of providing an improved rotatability to a rotating shaft incorporated therein.

DESCRIPTION OF THE PRIOR ART

As is well known, a head drum assembly for use in a VCR comprises a plurality of moving parts, e.g., a rotary drum; and stationary parts, e.g., a stationary drum. Normally, the head drum assembly is broadly classified into either a ball-bearing type or a sliding-bearing type, depending on how the moving parts and the stationary parts are mechanically interrelated.

In FIG. 1, there is shown one of the conventional ball-bearing type head drum assemblies, which includes a rotating shaft 1, a rotary drum 2, a flange 3, a stationary drum 4, an upper and a lower ball bearings 5, 5', a rotor transformer 6, a stator transformer 6' and a pair of heads 7.

The rotary drum 2 is provided with the pair of heads 7 on its lower surface and fixed to a flange 3 by, using, e.g., a fixing screw 9.

The flange 3 is provided with the rotor transformer 6 attached on its lower surface by an adhesive or the like and the rotating shaft 1 is tightly fitted thereinto.

The stationary drum 4 is provided with a bore 8 through its center, the bore 8 having an upper part 8a with a larger diameter, a middle part 8b with a smaller diameter and a lower part 8c with the same larger diameter as the upper part 8a. Furthermore, in the upper and the lower parts 8a, 8c of the bore 8, there are respectively arranged the upper and the lower bearings 5, 5' for facilitating the rotation of the rotating shaft 1 and the rotary drum 2 rotating with it in relation to the stationary drum 4. Furthermore, the stationary drum 4 is fitted around a lower portion of the rotating shaft 1.

Meanwhile, the stator transformer 6' is attached on a top surface of the stationary drum 4 in such a way that it is aligned with the rotor transformer 6 but separated therefrom by a predetermined gap.

In such a ball-bearing type head drum assembly, since the lower part of the bore of the stationary drum has to be precisely machined to stably accommodate the lower ball bearing, the manufacturing process thereof is time consuming and difficult. In addition, the two ball bearings are used for supporting the rotating shaft, resulting in an increase in a production cost.

FIG. 2, on the other hand, illustrates one of the conventional sliding-bearing type head drum assemblies, which includes a fixed shaft 10, a rotary drum 20, a stationary drum 30 and a pair of thrust bearings 40.

The fixed shaft 10 is provided with a plurality of herring-bone shaped grooves 10a on its upper portion to give rise to a first set of bearing surfaces 11o The rotary drum 20 is fitted around the upper portion of the fixed shaft 10 and is provided with a second set of bearing surfaces 21 that matches the first set of bearing surfaces 11, while the stationary drum 30 is fitted around a lower portion of the fixed shaft 10.

The fixed shaft 10 and the rotary drum 20 are in contact only through their respective bearing surfaces 11 and 21, allowing the rotary drum 20 to rotate easily around the fixed shaft 10. The rotatability of the rotary drum 20 is further enhanced by applying a lubricant between the first set of bearing surfaces 11 of the fixed shaft 10 and the second set of bearing surfaces 21 of the rotary drum 20. The lubricant applied reduces friction between the fixed shaft 10 and the rotary drum 20.

Each of the thrust bearings 40, with herring-bone shaped grooves (not shown) on its bottom surface, is attached to the rotary drum 20. Furthermore, each of the thrust bearings 40 serves to constrain the rotary drum 20 from moving toward and coming in contact with the stationary drum 30 and to allow the rotary drum 20 to rotate easily around the fixed shaft 10.

However, in such a sliding-bearing type head drum assembly, it is not only difficult to arrange the thrust bearings in the fixed shaft, but also difficult to construct the herring-bone shaped grooves on the bottom surface of each of the thrust bearings.

SUMMARY OF THE INVENTION

It is, therefore, a primary object of the present invention to provide a head drum assembly capable of overcoming shortcomings present in the ball-bearing type and the sliding-bearing type head drum assemblies mentioned above.

It is another object of the present invention to provide a head drum assembly having a simple structure.

It is a further object of the present invention to provide a head drum assembly capable of imparting an improved rotatability to a rotating shaft incorporated therein.

In accordance with a preferred embodiment of the present invention, there is provided a head drum assembly for use in a VCR comprising: a rotating shaft having a bearing surface on its lower portion; a flange tightly fitting around an upper portion of the rotating shaft; a rotary drum joined to the flange; a plurality of heads mounted on a lower surface of the rotary drum; a stationary drum provided with a bore through its center, the bore having an upper part for accommodating therein a ball bearing, a middle part, and a lower part for accommodating therein a sliding bearing, the lower part matching the bearing surface of the rotating shaft; and a rotor and a stator transformers attached to a lower surface of the flange and to a top surface of the stationary drum, respectively.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Figure 1:
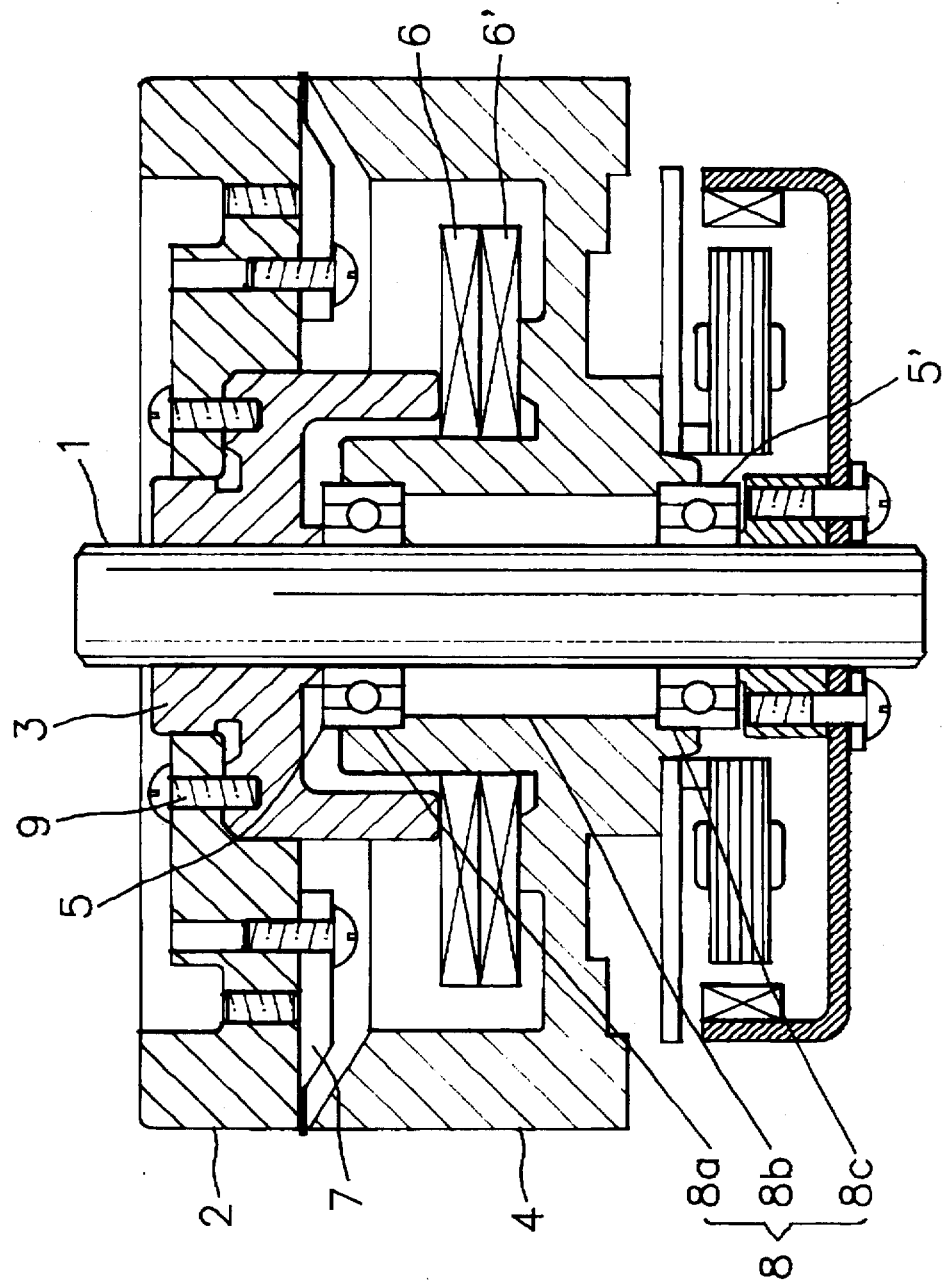
FIG. 1 shows a cross sectional view of the conventional ball-bearing type head drum assembly for use in a VCR.
Figure 2:
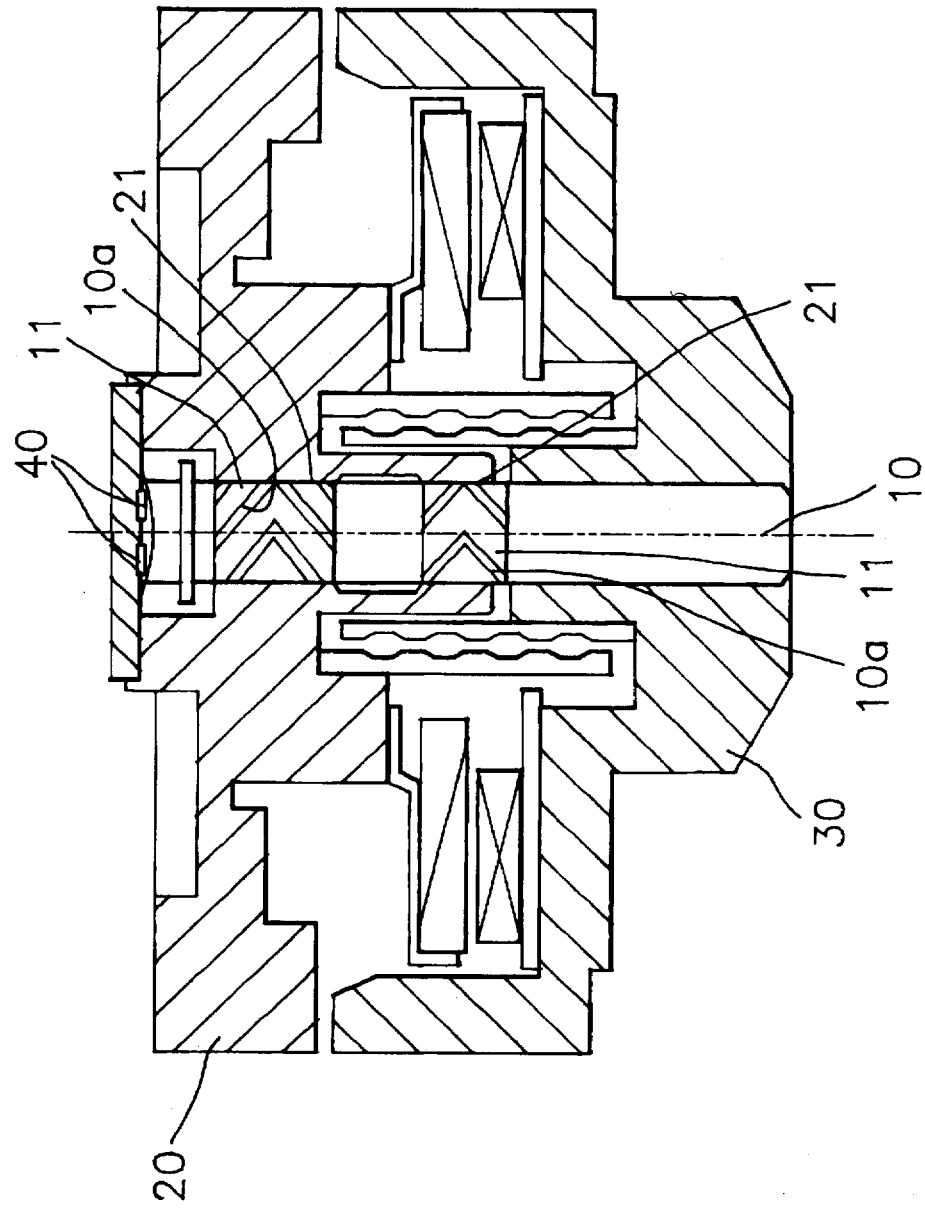
FIG. 2 illustrates a cross sectional view of the conventional sliding-bearing type head drum assembly for use in a VCR.

An inventive head drum assembly in accordance with a first preferred embodiment of the present invention will be described using FIGS. 3 to 6. It should be noted that like parts appearing in FIGS. 3 to 8 are represented by like reference numerals.

Figure 3:
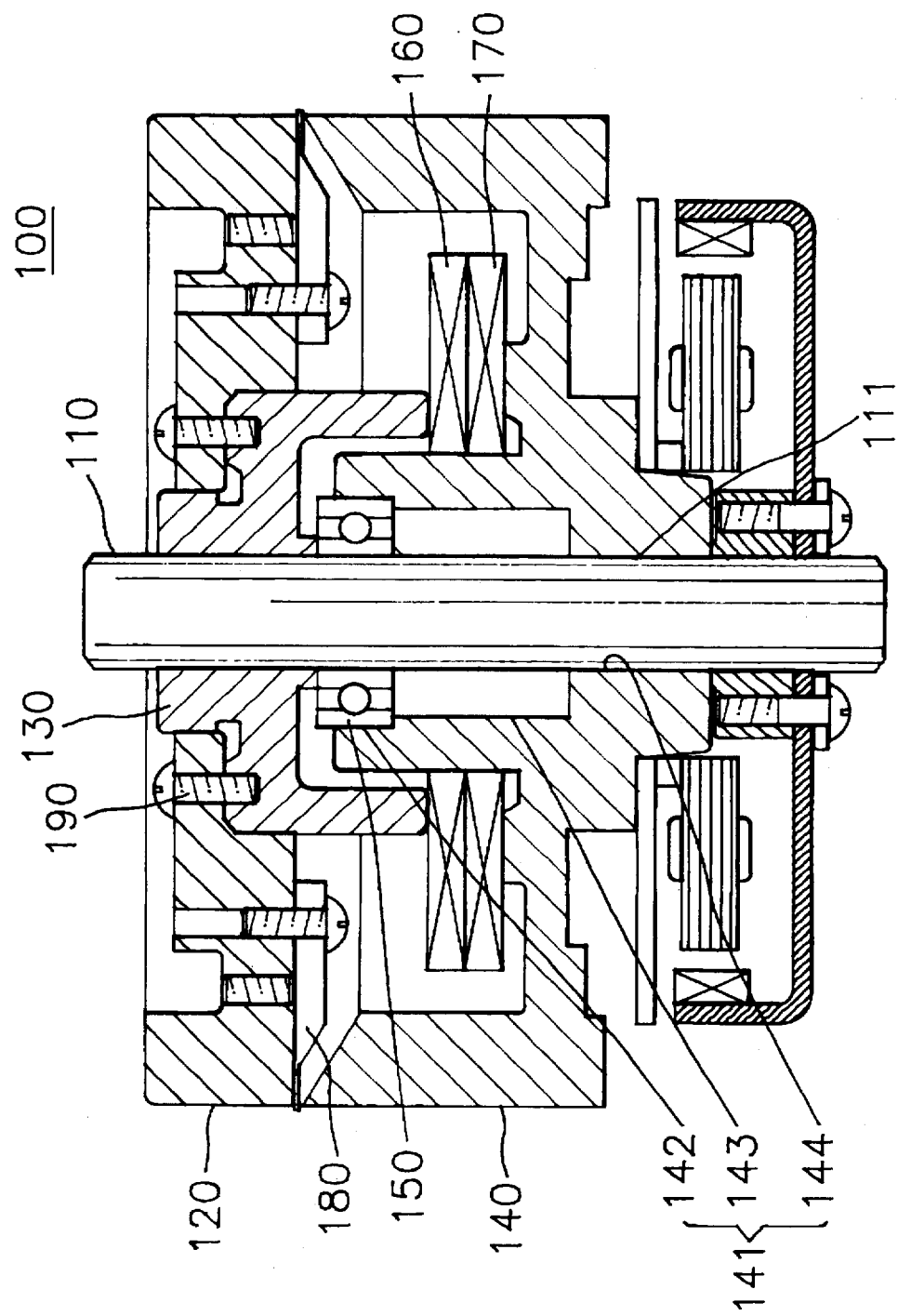
FIG. 3 depicts a cross sectional view of the head drum assembly in accordance with a first preferred embodiment of the present invention.

Referring to FIG. 3, there is shown a cross sectional view of a head drum assembly 100 for use in a VCR in accordance with the first preferred embodiment of the present invention. The head drum assembly 100 comprises a rotating shaft 110, a rotary drum 120, a flange 130, a stationary drum 140, a ball bearing 150, a rotor transformer 160, a stator transformer 170 and a plurality of heads 180.

The rotary drum 120 is provided with a plurality of heads 180 on its lower surface and fixed to a flange 130 by using, e.g., a screw 190.

The flange 130 is provided with the rotor transformer 160 attached on its lower surface by an adhesive or the like, and the rotating shaft 110 having a bearing surface ill on its lower part is tightly fitted thereinto.

The stator transformer 170 is attached on a top surface of the stationary drum 140 in such a way that it is aligned with the rotor transformer 160 but separated by a predetermined gap.

The stationary drum 140 is provided with a bore 141 through its center, the bore 141 having an upper part 142 with a larger diameter, a middle part 143 and a lower part 144 matching the bearing surface 111 of the rotating shaft 110. The lower part 144 acts as a sliding bearing means. In the larger diameter part 142 of the bore 141 of the stationary drum 140, the ball rolling bearing, e.g., bearing 150 is arranged in such a way that it provides a load supporting ability in the axial and the radial directions.

The rotatability of the rotary drum 120 rotating with the rotating shaft 110 is further enhanced by applying a lubricant between the rotating shaft bearing surface 111 and the lower part 144 of the bore 141 of the stationary drum 140. The lubricant applied between them lowers both the static frictional coefficient and the kinetic frictional coefficient during the rotation. Thus, the lubricant allows easy rotation of the rotary drum 140 rotating with the rotating shaft 110, and also keeps the rotating shaft bearing surface 111 and the lower part 144 of the bore 141 of the stationary drum 140 from abrading away.

Figure 4A:
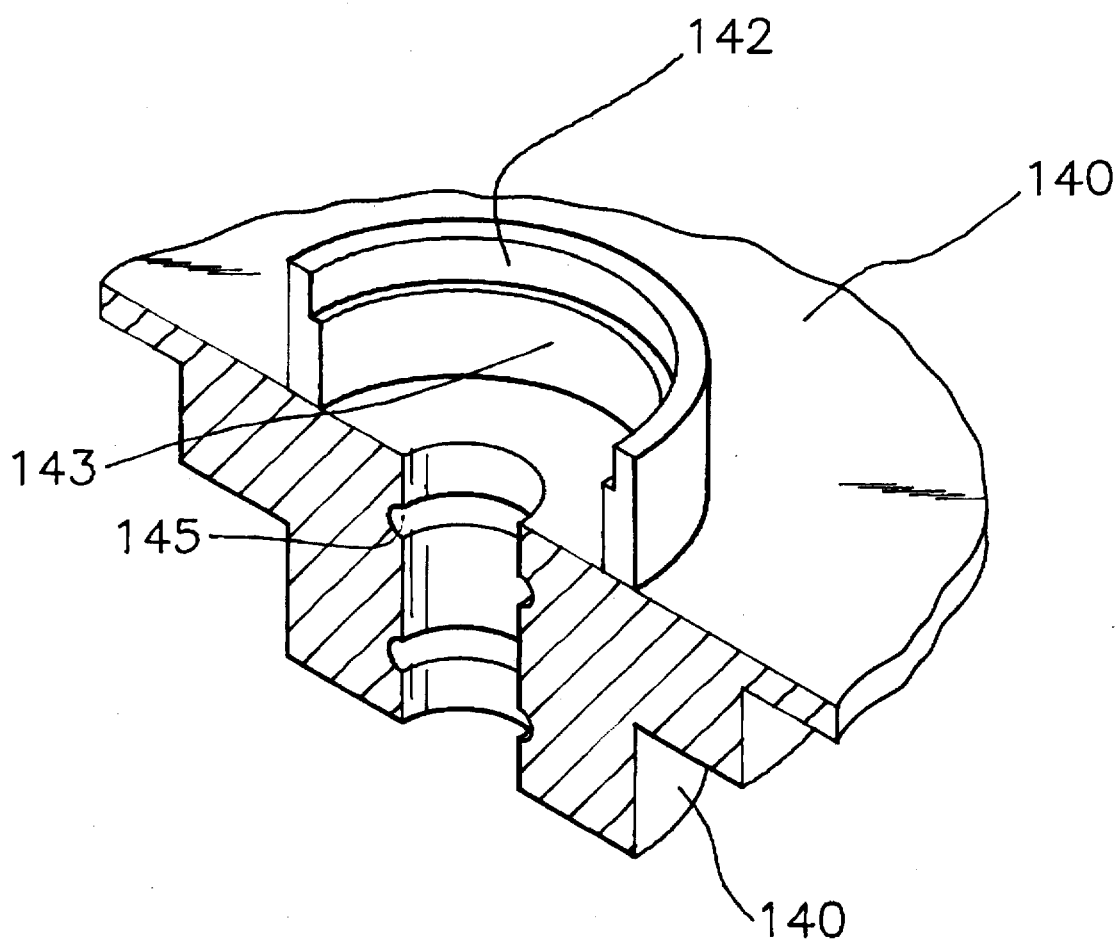
FIGS. 4A, 4B and 4C provide schematic sectional perspective views of the stationary drum in accordance with the first preferred embodiment of the present invention.
Figure 4B:
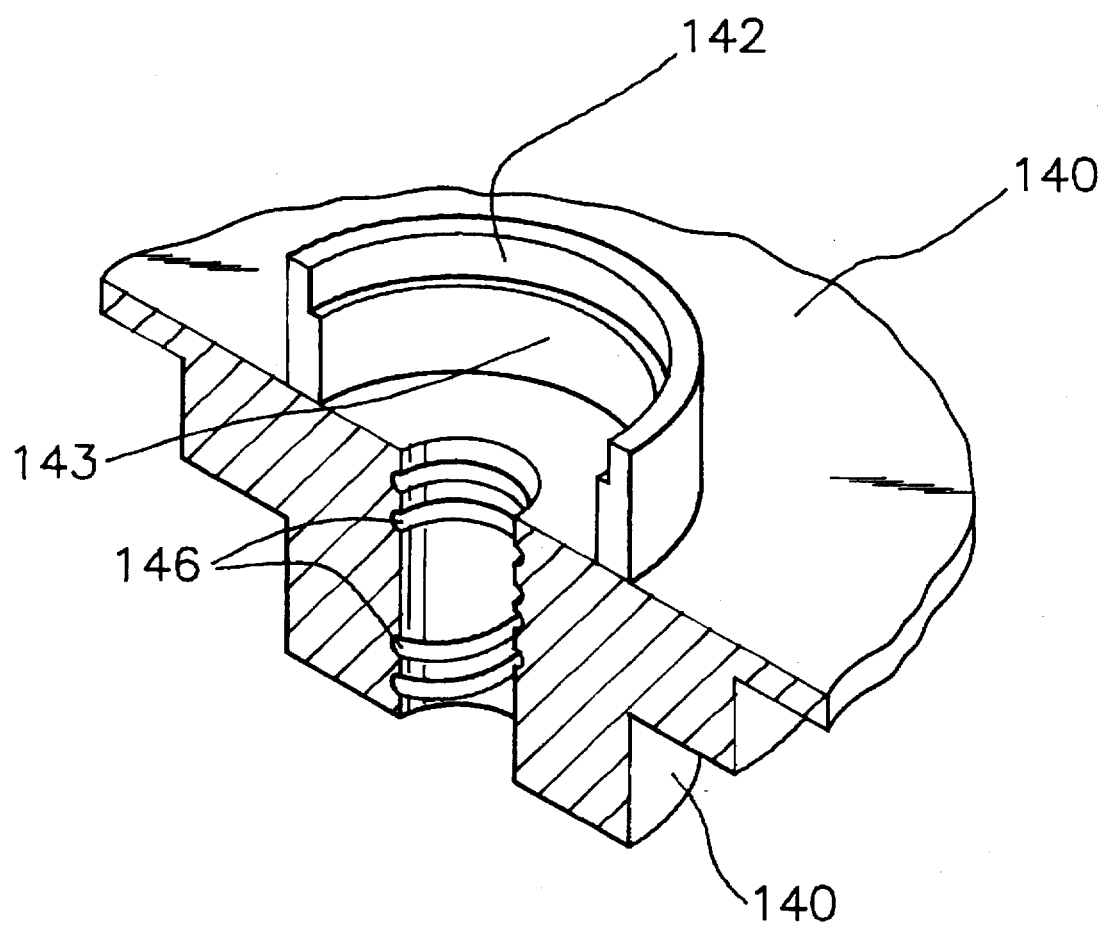
Figure 4C:
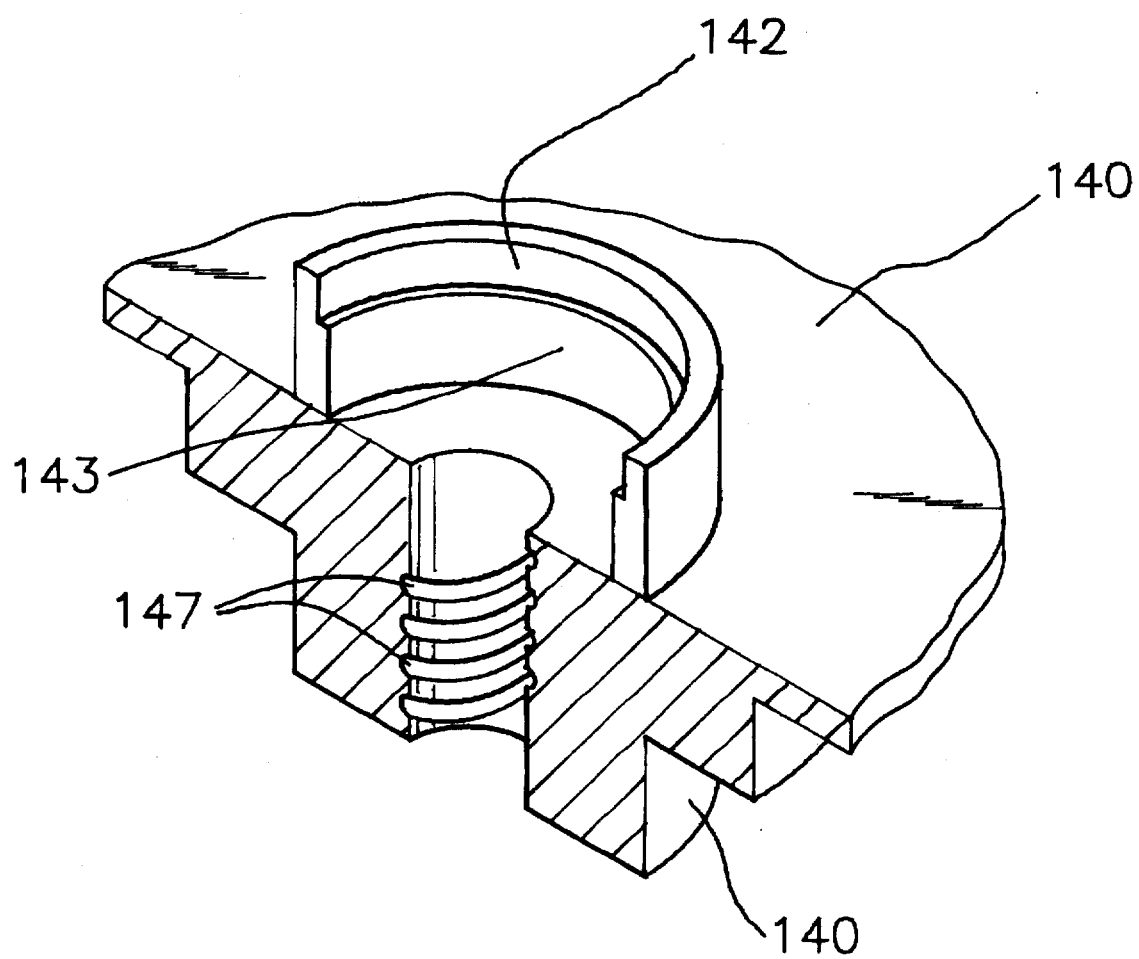

As shown in FIG. 4, the lower part 144 of the bore 141 is provided with a plurality of variously shaped grooves 145, 146 and 147 in order to facilitate the rotation of the rotating shaft 110 and the rotary drum 120 in relation to the stationary drum 140.

During rotation, the grooves 145, 146 and 147 serve to continuously provide the lubricant into a space between the rotating shaft bearing surface 111 and the lower part 144 of the stationary drum 140 and thus further facilitate the rotation of the rotary drum 120.

Figure 5:
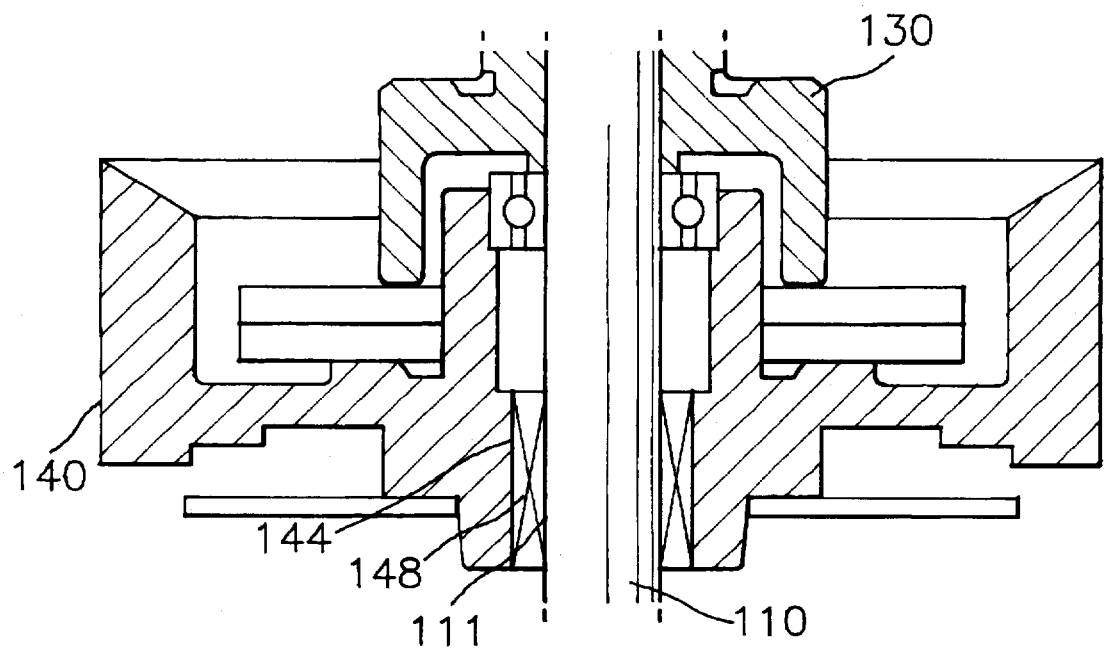
FIG. 5 offers a partial cross sectional view of the head drum assembly employing the oilless bearing in accordance with the first preferred embodiment of the present invention.

On the other hand, instead of providing the aforementioned grooves 145, 146 and 147 at the lower part 144 of the bore 141, for example, an oilless bearing 148 may be provided between the rotating shaft bearing surface 111 and the lower part 144, as shown in FIG. 5.

Figure 6:
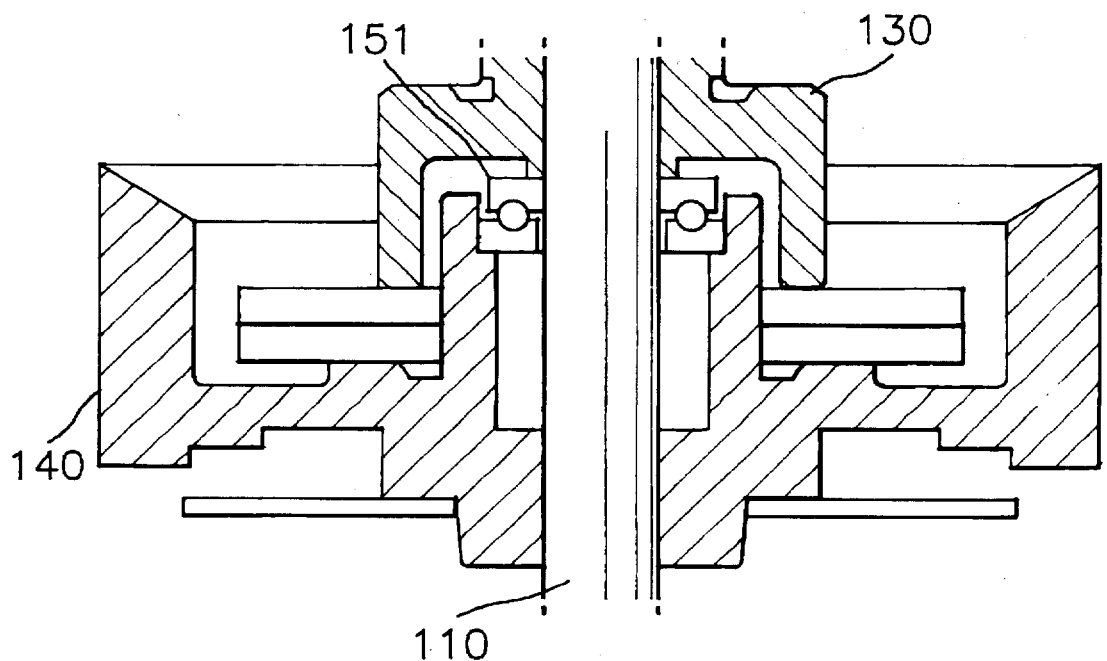
FIG. 6 presents a cross sectional view of the head drum assembly employing the thrust ball bearing in accordance with the first preferred embodiment of the present invention.

Furthermore, instead of installing the ball bearing 150 in the larger diameter part 142 of the bore 141 of the stationary drum 140 as shown in FIG. 3, a thrust ball bearing 151 may be provided therein, as shown in FIG. 6.

In such a head drum assembly, since the stationary drum is provided with bearing means on its upper portion and sliding means on its lower portion respectively, the manufacturing process is simple and the production cost is reduced in comparison with the head drum assembly employing the two ball bearings as a rotating shaft supporting unit.

Figure 7:
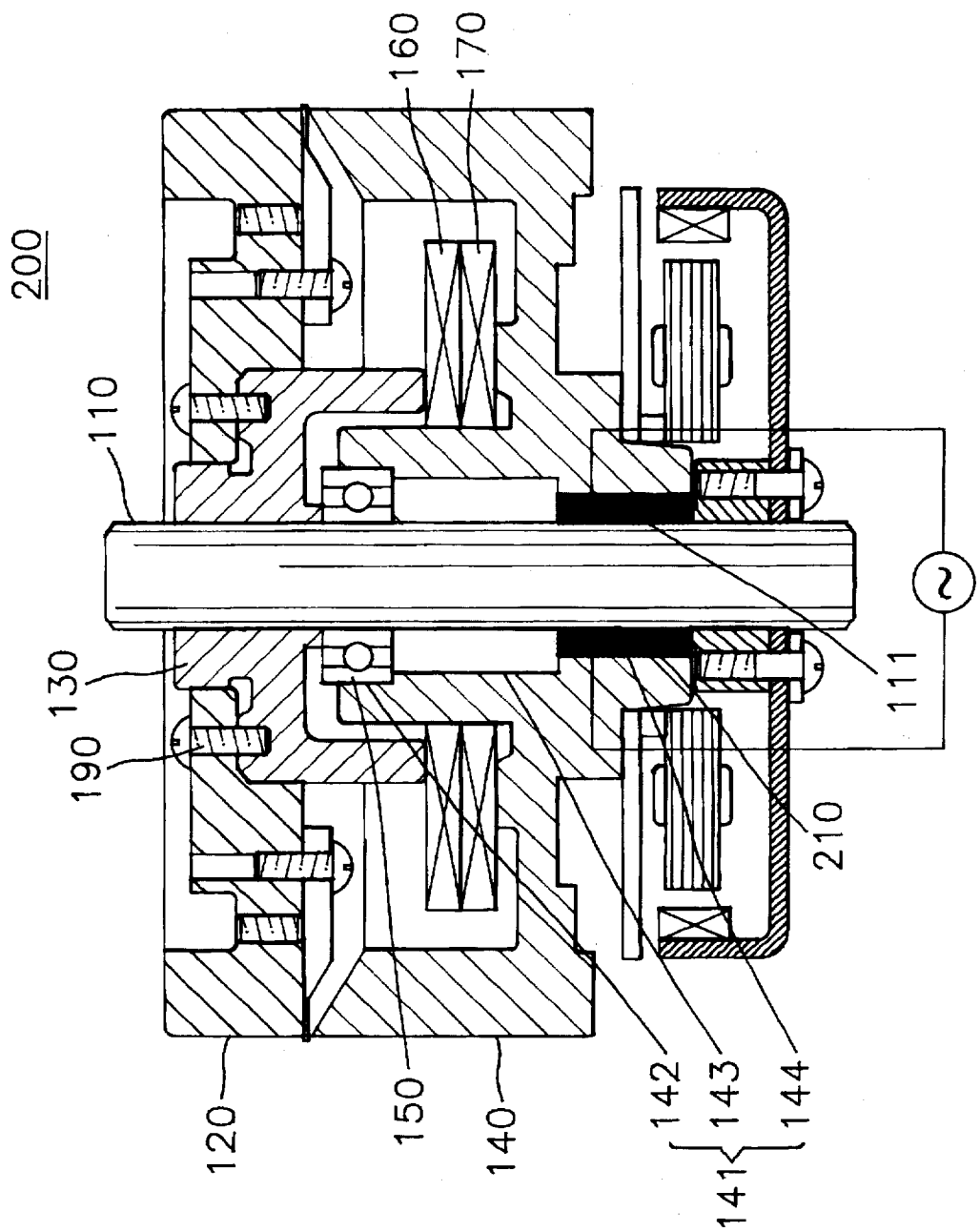
FIG. 7 represents a cross sectional view of the head drum assembly in accordance with a second preferred embodiment of the present invention.

An inventive head drum assembly 200 in accordance with a second preferred embodiment of the present invention will now be described with reference to FIG. 7.

This embodiment is similar to the first one, except that a piezoelectric bearing 210 is provided between the rotating shaft 110 and the lower part 144 of the bore 141 of the stationary drum 140 to create a load bearing air layer therebetween.

As is well known, a piezoelectric material deforms in response to an electric field applied thereto. Thus, by applying a sinusoidal voltage signal to the piezoelectric bearing, it is possible to generate the load supporting air layer.

Figure 8:
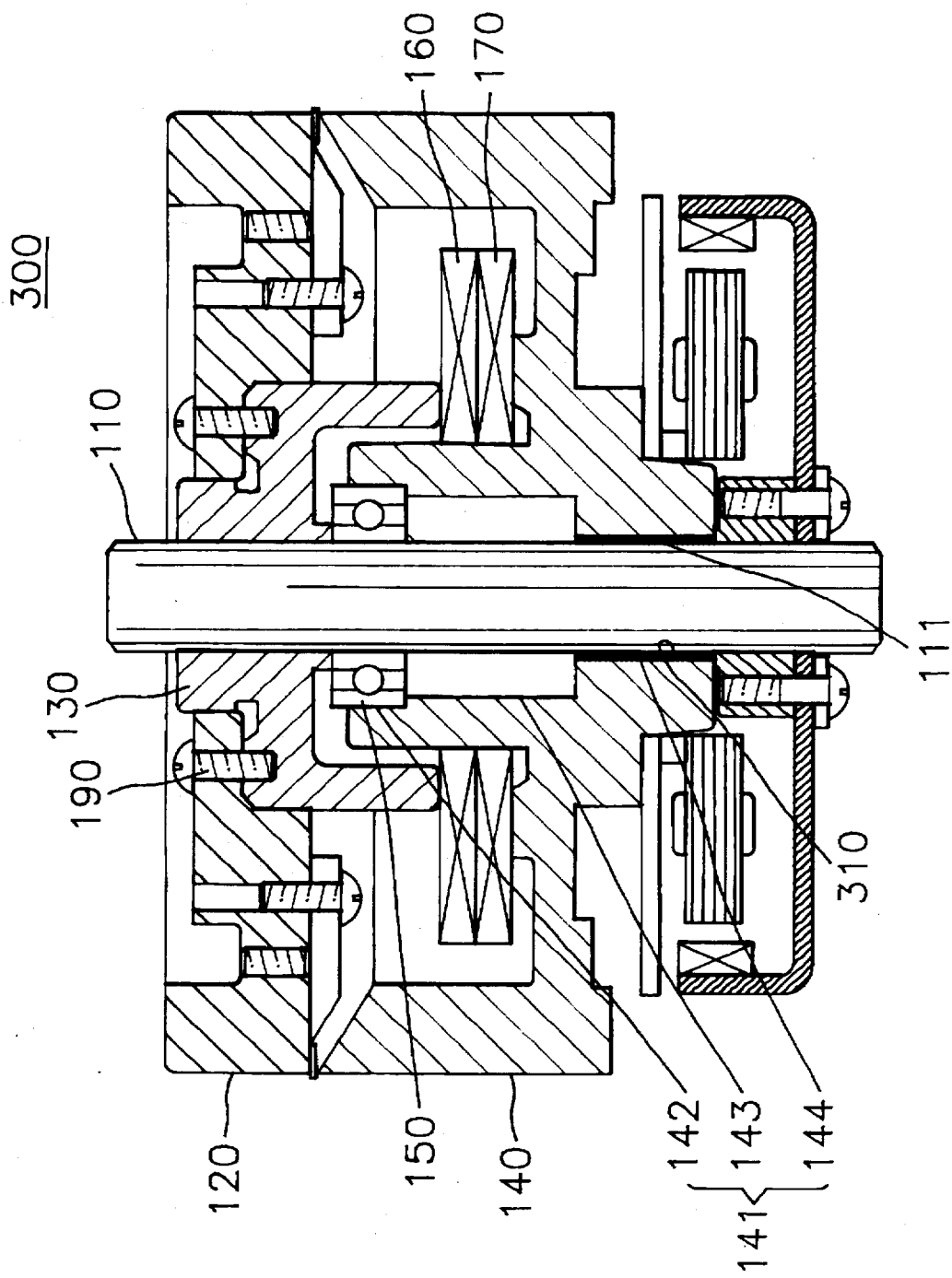
FIG. 8 displays a cross sectional view of the head drum assembly in accordance with a third preferred embodiment of the present invention.

The inventive head drum assembly 300 in accordance with a third preferred embodiment of the present invention will now be described with reference to FIG. 8.

This embodiment is similar to the first preferred embodiment except that a lower frictional coefficient material 310 such as a diamond-like carbon (DLC) is coated on the bearing surface 111 of the rotating shaft 110 and/or the lower part 144 of the bore 141 of the stationary drum 140. Since the DLC can be effectively used in reducing friction, only one of the two surfaces that are in contact with each other needs to be coated with the DLC.

As the DLC coated surface has a small frictional coefficient, the rotating shaft 110 and the rotary drum 120 can rotate with a minimum of friction.

Such a head drum assembly employing the DLC coating is disclosed in greater detail in a co-pending, commonly owned application, E.P. Ser. No. 95119130.3, entitled "HEAD DRUM ASSEMBLY FOR USE IN A VIDEO CASSETTE RECORDER INCORPORATING THEREIN A DIAMOND-LIKE CARBON THIN FILM COATING", which is incorporated herein by reference.

In such a head drum assembly, it is possible to reduce friction between the shaft and the stationary drum, thereby providing an improved rotatability to the rotary drum rotating with the shaft incorporated therein.

Although the invention has been shown and described with respect to the preferred embodiments, it will be apparent to those skilled in the art that various changes and modifications may be made without departing from the scope of the invention as defined in the following claims.

What is claimed is:

1. A head drum assembly for use in a video cassette recorder, comprising:

a rotating shaft having a bearing surface on its lower portion;

a flange fitting around an upper portion of the rotating shaft;

a rotary drum fixed to the flange;

a stationary drum attached to the rotating shaft under the rotary drum and provided with a bore through its center, the bore having an upper part, a middle part, and a lower part matching the bearing surface of the rotating shaft;

bearing means for rotatably supporting the rotating shaft, the bearing means including a rolling bearing means disposed between the rotating shaft and the upper part of the stationary drum and a sliding bearing means disposed between the rotating shaft and the lower part of the stationary drum.

2. The head drum assembly of claim 1, wherein the rolling bearing means is a thrust ball bearing.

3. The head drum assembly of claim 1, wherein the sliding bearing means is a piezoelectric bearing.

4. The head drum assembly of claim 1, wherein the lower part of the bore of the stationary drum matching the bearing surface of the rotating shaft is formed with one or more grooves for providing a lubricant into a space therebetween.

5. The head drum assembly of claim 1, wherein the lower part of the bore of the stationary drum matching the bearing surface of the rotating shaft is coated with a diamond-like carbon.

6. The head drum assembly of claim 1, wherein the bearing surface of the rotating shaft matching the lower part of the bore of the stationary drum is coated with a diamond-like carbon.

* * * * *